(12) United States Patent
Selstad et al.

(10) Patent No.: US 9,832,451 B2
(45) Date of Patent: Nov. 28, 2017

(54) METHODS FOR REDUCED-BANDWIDTH WIRELESS 3D VIDEO TRANSMISSION

(71) Applicant: Survios, Inc., Culver City, CA (US)

(72) Inventors: Johnathon Selstad, Agoura Hills, CA (US); Nathan Burba, Los Angeles, CA (US)

(73) Assignee: Survios, Inc., Culver City, CA (US)

( * ) Notice: Subject to any disclaimer, the term of this patent is extended or adjusted under 35 U.S.C. 154(b) by 0 days.

(21) Appl. No.: 15/355,033

(22) Filed: Nov. 17, 2016

(65) Prior Publication Data
US 2017/0155885 A1 Jun. 1, 2017

Related U.S. Application Data

(60) Provisional application No. 62/256,502, filed on Nov. 17, 2015.

(51) Int. Cl.
| | |
|---|---|
| *H04N 7/18* | (2006.01) |
| *H04N 9/47* | (2006.01) |
| *H04N 13/00* | (2006.01) |
| *H04N 13/04* | (2006.01) |
| *G06T 7/20* | (2017.01) |
| *G06T 7/593* | (2017.01) |

(52) U.S. Cl.
CPC .......... *H04N 13/0059* (2013.01); *G06T 7/20* (2013.01); *G06T 7/593* (2017.01); *H04N 13/0022* (2013.01); *H04N 13/0438* (2013.01); *H04N 13/0484* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 2009/0189830 A1* | 7/2009 | Deering | G09G 3/02 345/1.3 |
| 2009/0195641 A1* | 8/2009 | Neuman | H04N 13/0003 348/47 |
| 2015/0049004 A1* | 2/2015 | Deering | G02B 27/0172 345/8 |
| 2016/0012643 A1* | 1/2016 | Kezele | G06T 19/006 345/633 |
| 2016/0267720 A1* | 9/2016 | Mandella | G06T 19/006 |

* cited by examiner

*Primary Examiner* — Talha M Nawaz
(74) *Attorney, Agent, or Firm* — Jeffrey Schox; Thomas Gwinn

(57) ABSTRACT

A method for reduced-bandwidth wireless 3D video transmission includes receiving initial first-eye frame data, reprojecting the initial first-eye frame data to the second eye (which creates initial second-eye frame data), receiving sensor data; time-warping the initial first-eye and second-eye frame data, and receiving next second-eye frame data S140. The method can additionally or alternatively include perspective warping the initial first-eye frame data; reprojecting the next second-eye frame data to the first eye (which creates next first-eye frame data); performing infilling on the next first-eye frame data with the perspective-warped initial first-eye frame data; time-warping the next first-eye and second-eye frame data; and/or encoding transmitted frame data with sensor data.

21 Claims, 12 Drawing Sheets

Frame 1: Eye 1

|

Perspective Warp according to
updated view (S150)

↓

Frame 1: Eye 1 (post perspective warp)

+

Frame 2: Eye 1 (pre-time-
warp, pre-infill)

|

Infill Frame 2: Eye 1 with warped
Frame 1: Eye 1 (S170)

↓

METHODS FOR REDUCED-BANDWIDTH WIRELESS 3D VIDEO TRANSMISSION

CROSS-REFERENCE TO RELATED APPLICATIONS

This application claims the benefit of U.S. Provisional Application Ser. No. 62/256,502, filed on 17 Nov. 2015, which is hereby incorporated in its entirety by this reference.

TECHNICAL FIELD

This invention relates generally to the virtual reality field, and more specifically to new and useful methods for reduced-bandwidth wireless 3D video transmission.

BACKGROUND

It was the early 1990s, and virtual reality (VR) had arrived. VR gaming systems populated arcades and movie theaters across the country; IBM announced Project Elysium, a "complete integrated VR workstation" for use by architects and builders. At the time, VR seemed poised to be the next big thing in computing. Unfortunately, the complex controls and underwhelming graphics of 90's VR systems prevented virtual reality from living up to its full potential, and the 'VR revolution' quickly fizzled out.

Over twenty years later, virtual reality is back in a big way. Soon, consumer VR hardware will be able to display virtual worlds so detailed that they are almost indistinguishable from reality. Yet, for all the progress that has been made in VR, the bandwidth and latency requirements for wireless transmission of video serve as a crippling limitation to the field.

Thus, there exists a need in the virtual reality field to create new and useful methods for reduced-bandwidth wireless 3D video transmission. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
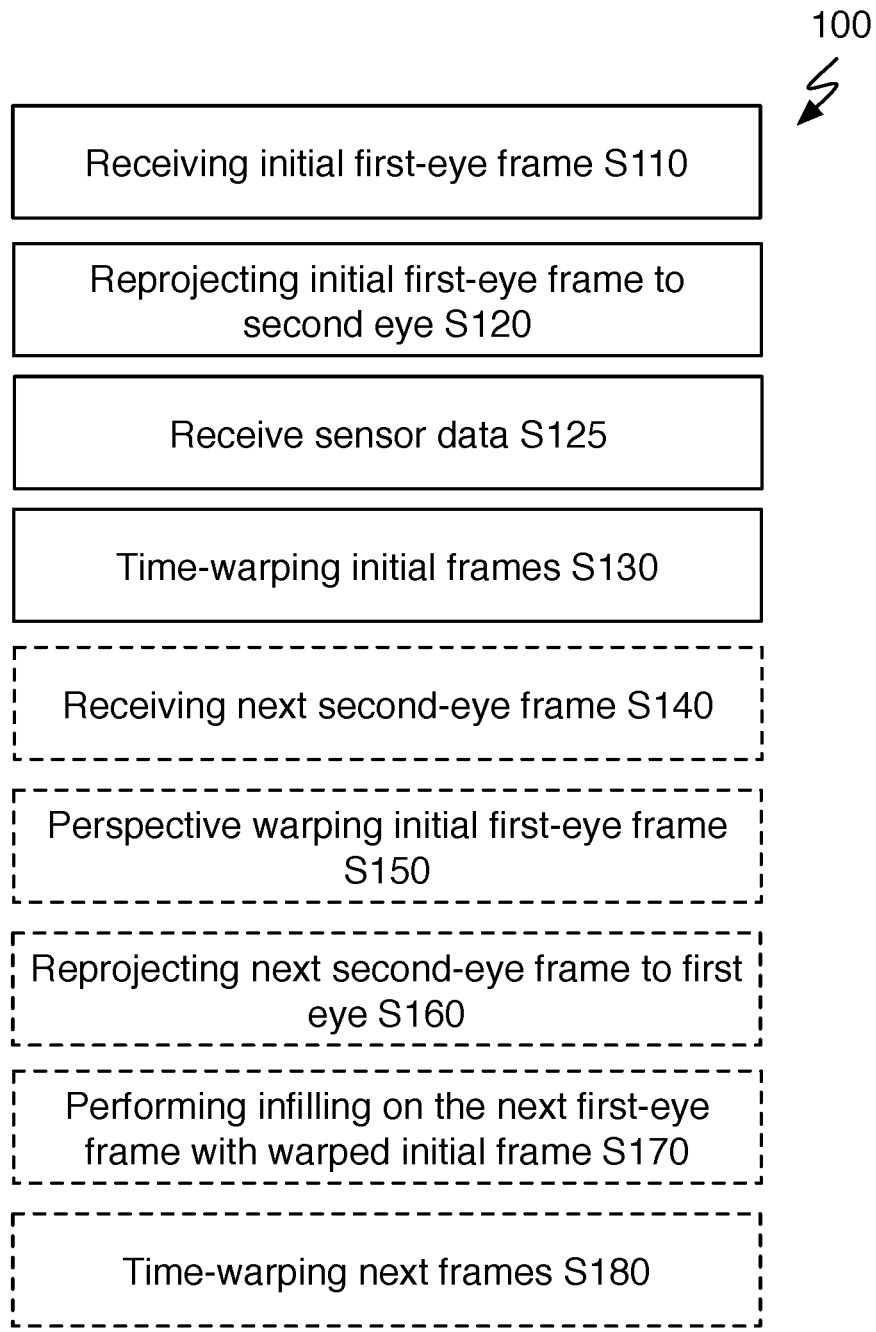
FIGS. 1A and 1B are chart representations of a method of a preferred embodiment.
Figure 1B:
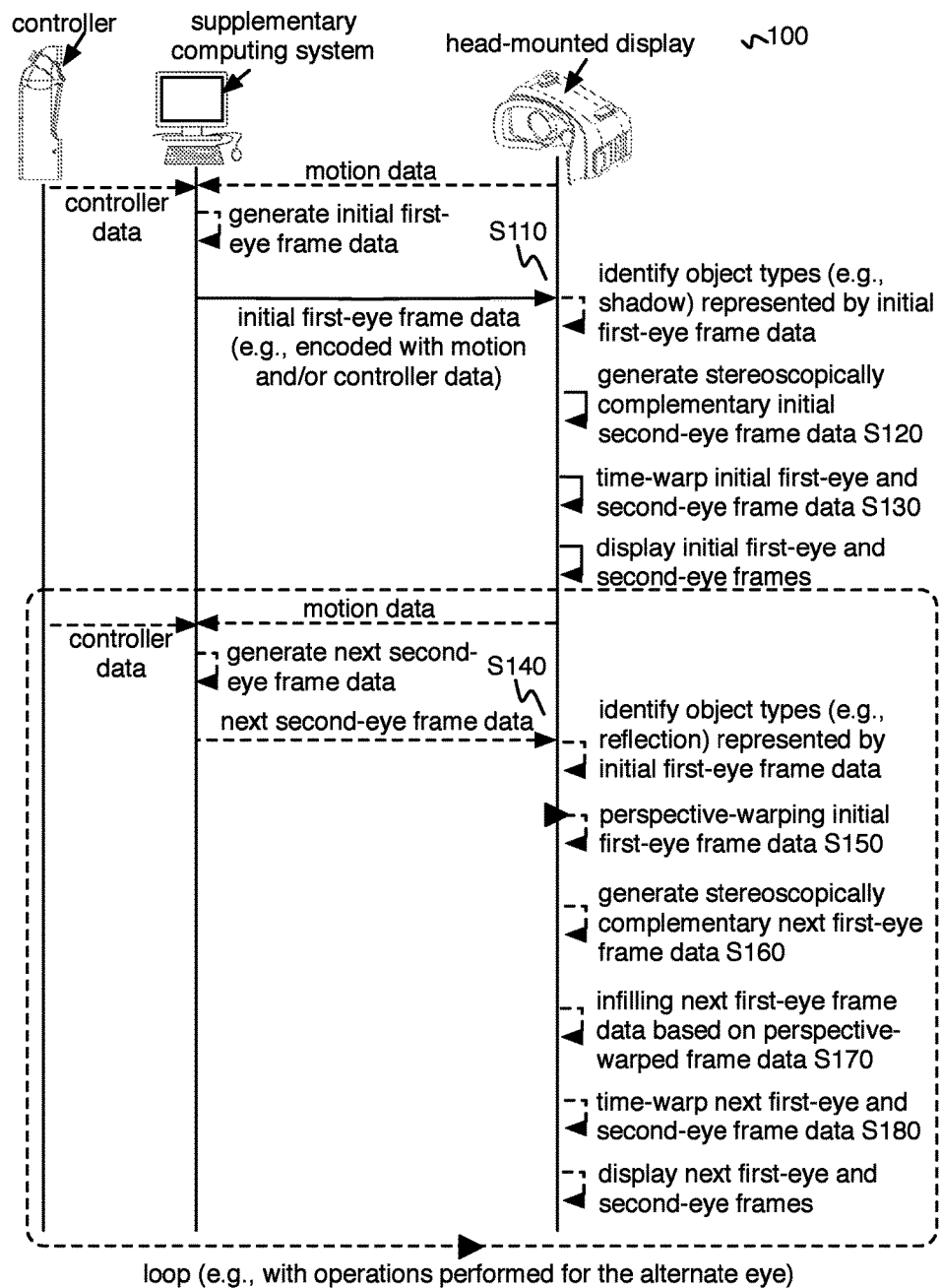
Figure 10:
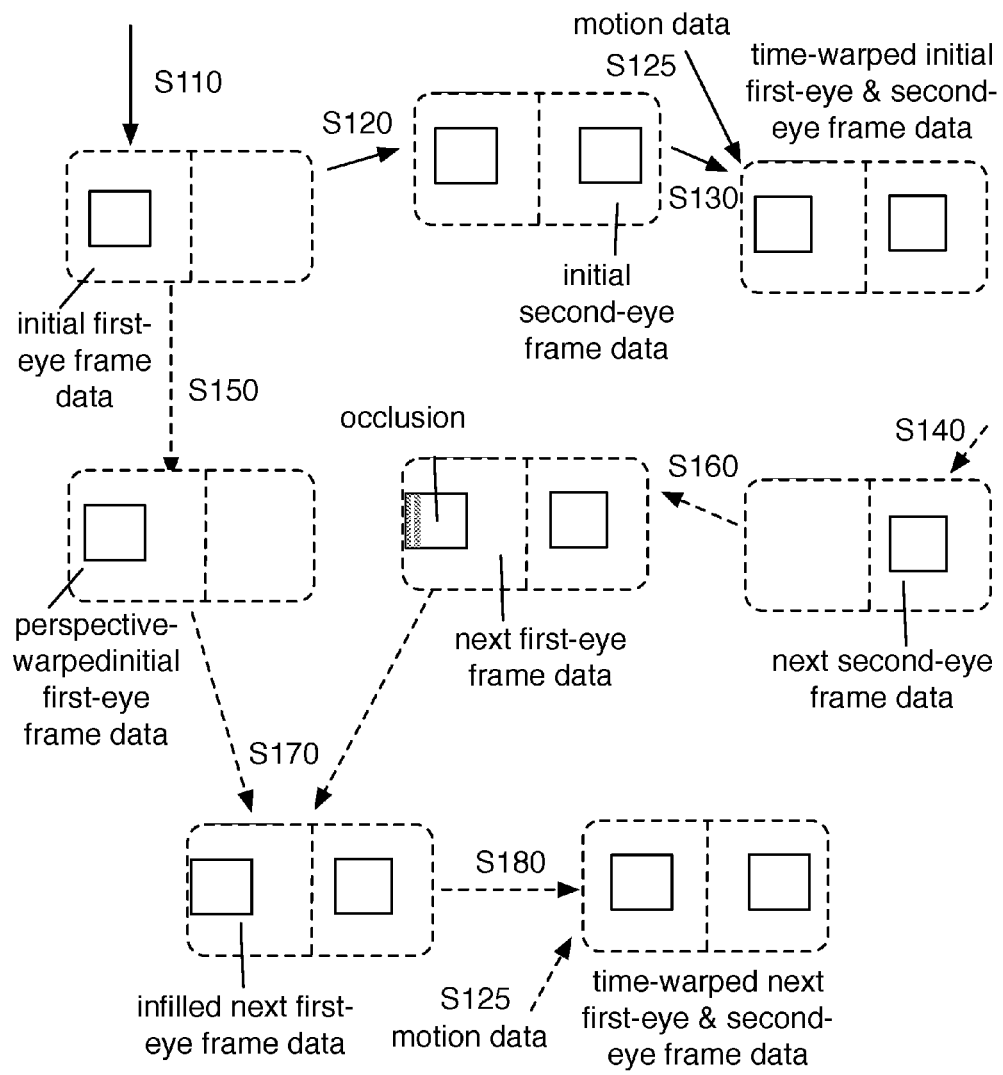
FIG. 10 is a chart representation of time-warping and infilling of a method of a preferred embodiment.

As shown in FIGS. 1A, 1B, and 10, a method 100 for reduced-bandwidth wireless 3D video transmission includes receiving initial first-eye frame data S110; reprojecting the initial first-eye frame data to the second eye S120 (which creates initial second-eye frame data); receiving sensor data S125; and time-warping the initial first-eye and second-eye frame data S130. The method 100 can additionally or alternatively include receiving next second-eye frame data S140; perspective warping the initial first-eye frame data S150; reprojecting the next second-eye frame data to the first eye S160 (which creates next first-eye frame data); performing infilling on the next first-eye frame data with the perspective-warped initial first-eye frame data S170; time-warping the next first-eye and second-eye frame data S180; and/or encoding transmitted frame data with sensor data S190.

The method 100 functions to enable the transmission of 3D video with reduced-bandwidth; by transmitting only a single eye frame (along with depth information) at each step, a stereo 3D image can be reconstructed with a reduction of data transmitted.

Figure 2:
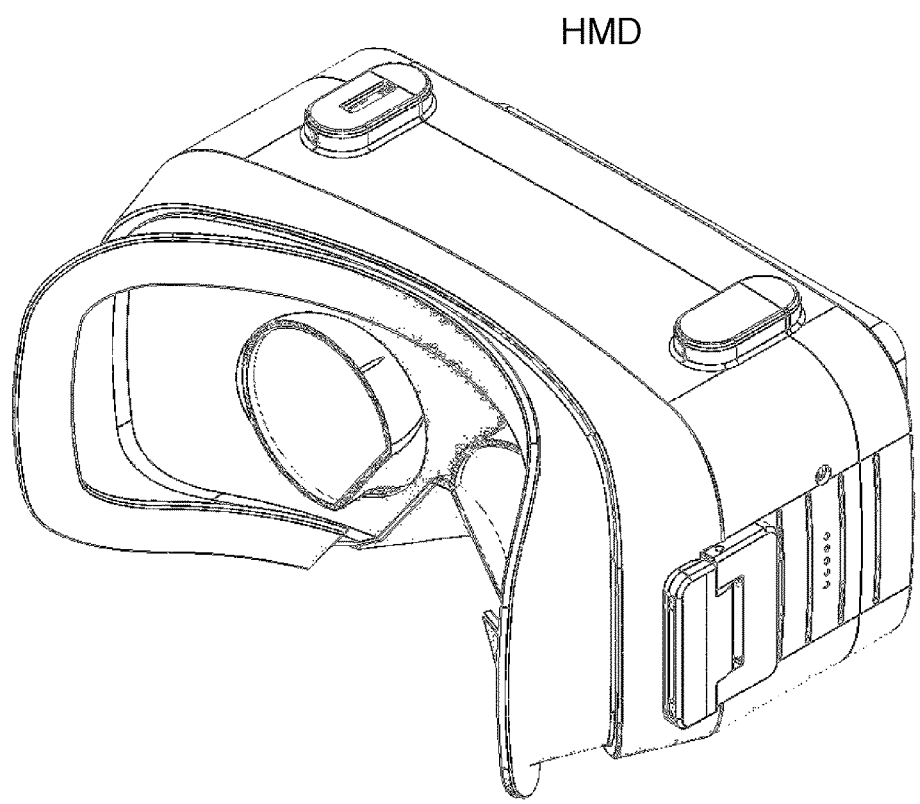
FIG. 2 is a perspective representation of a head-mounted display.

The method 100 and/or portions of the method 100 is preferably operable on a wireless head-mounted display (HMD), as shown in FIG. 2, but may additionally or alternatively be operated on any 3D image display. At least some of the steps of the method 100 may additionally or alternatively be performed by a supplementary computing system (e.g., a local computing device external to the 3D image display and/or a remote computing device).

2. Benefits.

Bandwidth requirements for transmitting image data (e.g., from a supplementary computing device to an HMD) can be prohibitive in achieving a desired frame rate. Instead of transmitting an RGB image for each eye (six image channels total), an RGB image for a single eye, along with a depth map, may be transmitted (four image channels total), for a 33% bandwidth reduction. This bandwidth reduction may be further increased by compressing the depth map, which often may vary less substantially than RGB information across pixel space. Likewise, this technique could be used to double framerate with only a 33% increase in bandwidth (eight image channels per unit time vs. six). Additional bandwidth savings may be accomplished by data compression (in particular, the depth information may be substantially more compressible than the RGB images).

The advantages described above are enabled by a reduction of transmission bandwidth, but the method 100 also may result in reduced computational load, which has its own advantages. For example, a system using the method 100 may be able to supersample images (i.e., render the images at high resolution and then downsample them to produce an anti-aliased image). Likewise, a system utilizing the method 100 may be able to operate on lower-bandwidth wireless video transmission links than otherwise possible, or on GPUs with less rendering power than otherwise necessary.

Further, the method 100 may be used to perform accumulative supersampling. By accumulating multiple renders and views (e.g., by layering new frames onto the time-warped buffer with 85% opacity); it's possible to refine edges in a manner similar to anti-aliasing and super sampling. This may help mitigate the flicker artifacts introduced from the rapidly switching frames. As such, the described advantages engender improvements to the functioning of the computing systems (e.g., reduced bandwidth requirements, reduced computational load, improved display of images, etc.) themselves, in addition to improvements to technological processes (e.g., image processing) overcoming technological issues (e.g., bandwidth bottlenecks, latency, framerate, judder, flicker artifacts, other image artifacts, etc.). Further, processing operations (e.g., reprojection, time-warping, etc.) that facilitate the advantages can constitute a transformation of a particular article (e.g., image data) to a different state or thing.

3. System for Reduced-Bandwidth Video Transmission.

A system for reduced-bandwidth wireless video transmission includes an HMD. The system can additionally or alternatively include a supplementary computing system, a controller, supplementary sensing devices (e.g., user mobile devices such as a user smart phone, optical systems such as infrared sensors for eye and/or face tracking, biometric sensors, triangulation systems, ultrasonic sensors, magnetic trackers, proximity sensors, pressure mats, treadmills, etc.), and/or any other component.

The HMD functions to enable the display of three-dimensional video data to a user in an immersive manner. The HMD accomplishes this by displaying offset two-dimensional images to the left and the right eye of a user, causing the perception of depth. The HMD preferably receives video data wirelessly from a local computing device, but may additionally or alternatively receive video data from any source over any connection type (e.g., a wire).

The HMD preferably includes motion and/or position sensing hardware (e.g., accelerometers, gyroscopes, magnetic field sensors, etc.). Additionally or alternatively, the HMD may communicate with motion and/or position sensors (e.g., the HMD may communicate with a user body-mounted accelerometer), or the HMD may include elements to be used with motion and/or position sensing hardware (e.g., infrared LEDs positioned on the HMD to be used with a video-based position tracker).

The HMD preferably includes processing hardware (e.g., a microcontroller, microprocessor, or other integrated circuit) to enable video processing (e.g., to enable time-warping, as described in later sections). Additionally or alternatively, video processing may be performed at a local or remote computer separate from the HMD.

In addition to motion/position sensing elements and processing hardware, the HMD preferably includes display elements and optics (to display video to the user), a housing, a head harness, and a battery. The HMD may additionally or alternatively include other peripherals (e.g., a microphone array, speakers, optical systems such as cameras and/or infrared sensors, ambient environment sensors such as temperature sensors and/or humidity sensors, proximity sensors such as radar systems, etc.). However, the HMD can be configured in any manner.

The supplementary computing system preferably functions to generate (e.g., render) frame data (e.g., unwarped, non-reprojected frame data) to transmit to an HMD for further processing (e.g., reprojection, warping, display, etc.). Additionally or alternatively, the supplementary computing system can function to transmit sensor data (e.g., received from the controller, from a supplementary sensing device, etc.) to the HMD but can additionally or alternatively function to perform any function. The supplementary computing system can include any one or more of a: local computing device (e.g., a desktop computer, a gaming console, etc.), a remote computing device (e.g., a remote server, etc.), databases (e.g., for storing frames, programs, code for performing operations performed by the HMD and/or other computing device, etc.), and/or other components. However, the supplementary computing system can be configured in any manner.

The controller functions to enable natural motion interaction by tracking position and/or orientation of a user's body part (e.g., hand) that is interacting with the controller (e.g., holding the hand controller). The one or more controllers are preferably communicably coupled (e.g., wirelessly coupled) to at least one of the HMD and the supplementary computing system. As such, the controller is preferably configured to transmit controller data (e.g., regarding user inputs at the controller; controller sensor data sampled at sensors of the controller; etc.) to any component, but can additionally or alternatively transmit and/or receive any data. However, the controller can be configured in any manner described in U.S. application Ser. No. 15/152,035, filed 11 May 2016, which is herein incorporated in its entirety by this reference, and/or configured in any manner.

Additionally or alternatively, the system can be configured in any manner.

4. Method for Reduced-Bandwidth Video Transmission.

S110 includes receiving initial first-eye frame data. S110 functions to obtain frame data for further processing operations (e.g., time-warping, reprojection, etc.) prior to display. S110 preferably occurs at the HMD or other 3D image display.

The initial first-eye frame data preferably includes two-dimensional RGB image element data (e.g., pixel data) constituting a two-dimensional RGB image. The image element data is preferably accompanied by a set of depth data for each of the image elements of the RGB image. Additionally or alternatively, the first-eye frame data may be any suitable two-dimensional image (e.g., a grayscale image) and/or image elements. The initial first-eye image elements and/or other image elements of a frame preferably include one or more pixels, super pixels, image segments, objects, vertexes associated with objects, and/or any suitable image element. The depth data is preferably a disparity map (i.e., a description of the disparity between the location of image elements of the first-eye frame data and the location of those same image elements if projected to the second-eye frame data), but may additionally or alternatively be any suitable depth data (e.g., a depth map providing a distance from the view plane of the first-eye frame for each pixel of the frame).

The initial first-eye frame data may additionally or alternatively include or be accompanied by any other data relevant to display; for example, the initial first-eye frame data may include view pose information (e.g., positional and rotational location of the view shown in the first-eye frame data relative to the scene). As another example, the initial first-eye frame data may include data useful for performing time-warping (e.g., the positional or rotational location of a user's head, the sensor data used to calculate such a location, or any other relevant data), reprojection, and/or any other suitable operation. In another example, the initial first-eye frame data and/or other frame data can include frame constituents (e.g., objects in the frame, geometry, textures, etc.) required for rendering the frame to be displayed at an HMD. In this example, rendering of one or more frames can be substantially performed at the HMD.

Figure 3:
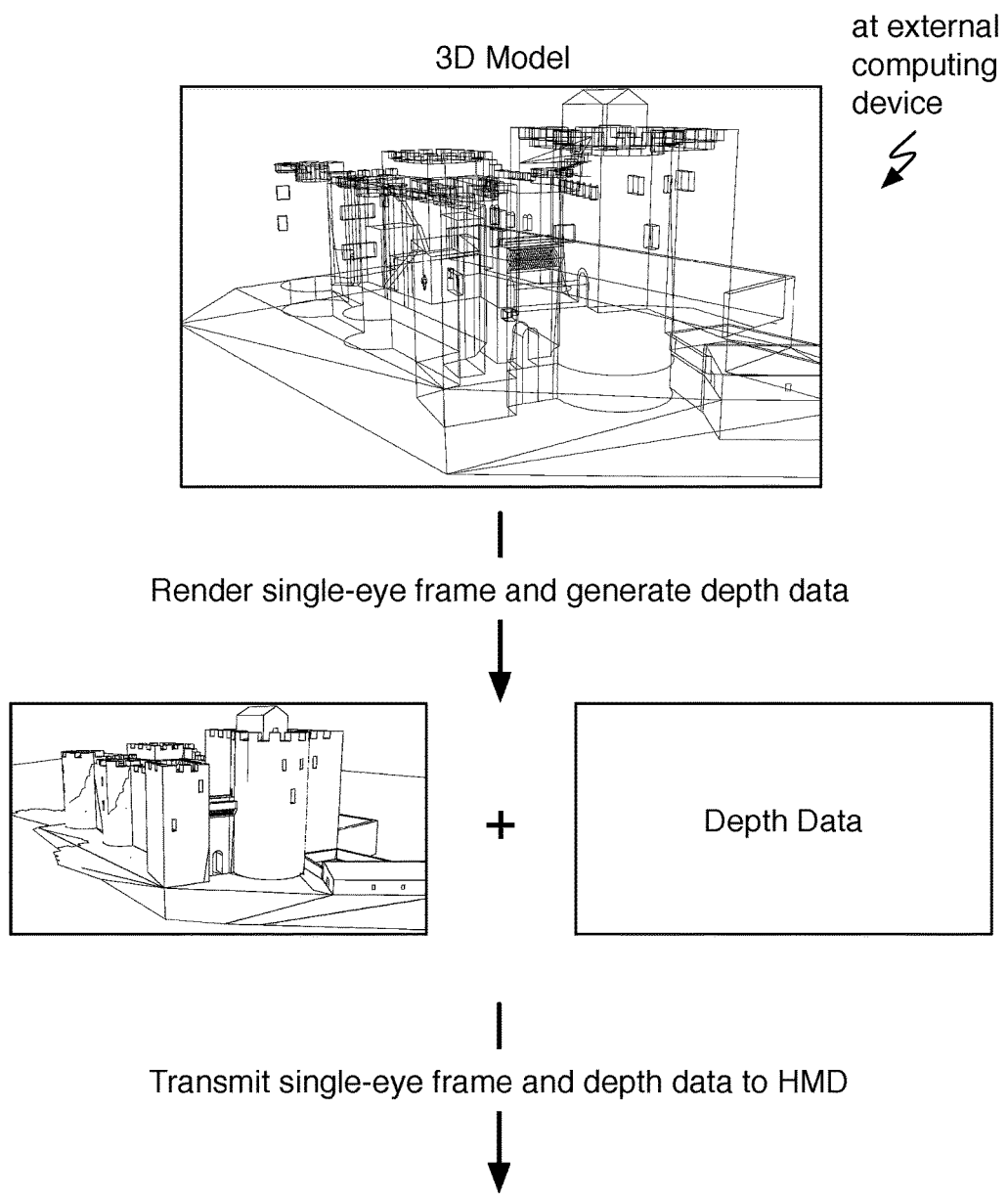
FIG. 3 is a chart representation of frame generation and transmission.

The initial first eye-frame data and depth data are preferably generated (e.g., rendered) in a local computing device and/or remote computing device external to the HMD, as shown in FIG. 3, but may additionally or alternatively be generated by the HMD.

Note that rendering only a single frame and generating depth data is less computationally intensive for the render-side (e.g., the external computing device) than rendering two frames, which may enable more processing than otherwise possible by the same piece of hardware (e.g., supersampling as previously described).

The initial first eye-frame data and/or other suitable frame data are preferably received from the rendering device to the HMD, other 3D display and/or other suitable component wirelessly, but may additionally or alternatively be transmitted in any manner (e.g., over a wire). The initial first-eye frame data and/or or other suitable frame data are preferably associated with a temporal indicator (e.g., a time, time period, time interval, etc.). In examples, the initial first-eye frame data can be associated with the time at which the frame data is generated, the time at which motion data (e.g., from which the frame data is generated) is sampled, and/or any suitable time. Further, receiving frame data for any eye can be at any time. However, receiving initial first-eye frame data and/or any suitable frame data can be performed in any manner.

Figure 4:
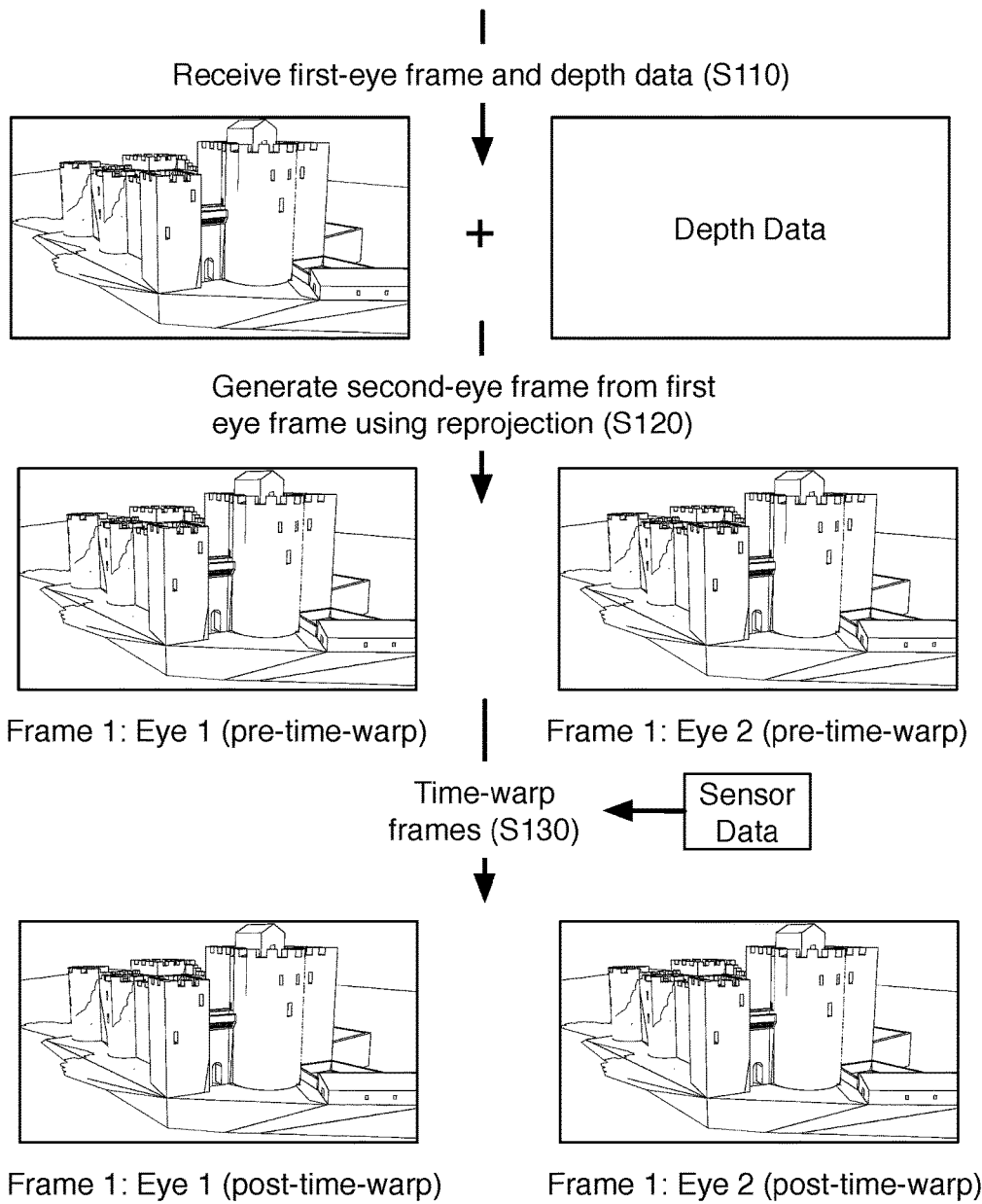
FIG. 4 is a chart representation of frame reception, reprojection, and time-warping of a method of a preferred embodiment.

S120 includes reprojecting the initial first-eye frame data to the second eye. S120 functions to generate the stereo complement to the first-eye frame data using the first-eye frame data and the associated depth data (e.g., the disparity map), as shown in FIG. 4. Reprojecting the initial first-eye frame data preferably includes generating initial second-eye frame data stereoscopically complementing the initial first-eye frame data, but can include generating any suitable complementary data based on the initial first-eye frame data. Reprojecting is preferably performed on unwarped frame data, but can additionally or alternatively be performed on warped frame data (e.g., performing Block S130 to generate output that can be input into Block S130), and/or any suitable frame data. For example, the method 100 can include time-warping an initial first-eye frame data; reprojecting the warped initial first-eye frame data to a second eye to generate warped initial second-eye frame data; and displaying the warped initial frames. S120 is preferably performed at the HMD or other 3D display, but may additionally or alternatively be performed by any suitable computing system. S120 may be performed by purpose-built hardware or by general purpose processors (e.g., a CPU, GPU).

If the frame data received in S110 includes a disparity map, S120 may include applying the pixel shift values contained within the disparity map to the pixels contained in the initial first-eye image to create the initial second-eye image.

S120 may include using any suitable reprojection algorithm or combination of reprojection algorithms.

Reprojecting the initial first-eye frame data (e.g., generating stereoscopically complementary initial second-eye frame data) is preferably based on depth data (e.g., associated with an initial first-eye image of the initial first-eye frame data) and distance between a first and a second eye of a user (e.g., a user currently wearing the HMD). For example, the method can include determining a distance between the first and second eyes of the user based on optical data sampled at an optical system (e.g., infrared sensors of the HMD); and determining image element shift values for shifting the location of each image element based on the optical data, in order to generate a stereoscopic complement. Alternatively, reprojection can be based on average eye distance (e.g., 66 mm) between human eyes.

Additionally or alternatively, reprojecting the initial first-eye frame data can be based on object types (e.g., perspective-independent objects, perspective-dependent objects, shadows, reflections, characters, etc.) represented by image elements of the frame data, sensor data (e.g., motion data sampled at the HMD, supplementary sensing device data, etc.), supplementary user information (e.g., vision parameters, body region dimensions, user preferences, etc.), and/or any suitable criteria. In an example, the method 100 can include identifying an object type (e.g., a view-independent object such as shadows and/or cube-mapped reflections) of an object represented by the first-eye frame data; determining a pixel shift value (e.g., no pixel shift for view-independent objects) for an image element corresponding to the object based on the object type; where generating the second-eye frame data includes shifting image element location of the image element based on the pixel shift value.

Note that as a result of the reprojection, the generated second-eye frame data can contain holes (e.g., occlusions): areas where the reprojected image does not contain any information. S120 may include performing contextual infilling to fill the holes; additionally or alternatively, infilling may be performed in a later step, or not at all. In particular, infilling may not be performed for initial frames since it will be performed for later frames (as described in S170).

The result of S120 is preferably a stereoscopic image pair, from which a 3D image may be perceived by an HMD user. Unfortunately, due to the latency inherent in wireless video transmission (and/or due to other latencies, such as those due to sensor data transmission and/or game state recalculation), by the time this image is displayed to an HMD user, it is possible than the user has moved his or her head, resulting in the need for an updated image. Thus, a time-warping step may be required to compensate for head movement between the rendering of a frame and the display of that same frame.

Reprojecting the initial first-eye frame data is preferably in response to receiving initial first-eye frame data (e.g., every time a first-eye image is received), but can be performed in relation to any suitable analysis event (e.g., performing S120 concurrently with time-warping the initial first eye frame data such as in S130), performed at a predetermined frequency, and/or at any time.

However, reprojecting the initial first-eye frame data can be performed in any manner.

S125 includes receiving sensor data, which functions to obtain data sampled at one or more sensors (e.g., HMD sensors, controller sensors, supplementary sensing devices, etc.) in order to facilitate frame processing operations (e.g., reprojection, time-warping, etc.). Sensor data preferably includes motion data sampled at a motion sensor of the HMD (e.g., a multi-axis accelerometer embedded in the HMD), but can additionally or alternatively include other HMD sensor data, controller data (e.g., sensor data from a sensor-embedded joystick; input data from a user pressing a button on the joystick; etc.), supplementary sensing device data, and/or any other suitable data. Motion sensor data, which may include any data used to describe the motion of a user and/or of a 3D display, can be used to determine position and/or rotation changes that occur between the rendering of a frame and the display of that frame to a user. Position/rotation changes preferably include any change in a six-axis coordinate system (e.g., x, y, z, pitch, roll, yaw) but may additionally or alternatively include any position or rotation change description. Motion sensor data preferably includes inertial measurement unit (IMU) data, but may additionally or alternatively include any type of motion and/or position data (e.g., accelerometer data, gyroscope data, magnetometer data, visual tracking data, audio tracking data, etc.). Motion sensor data is preferably captured by the HMD, but may additionally or alternatively be captured by any source (e.g., by a camera coupled to an external computing device). Received sensor data can be associated with any suitable temporal indicator. In an example, S130 can include: receiving a first motion dataset corresponding to a first time associated with generation of the first-eye frame data; and receiving a second motion dataset corresponding to a second time associated with receiving the first-eye frame data. In another example, sensor data encoded in received initial first-eye frame data can include sensor data used in generating the initial first-eye frame data as well as historic sensor data.

Sensor data is preferably received at the HMD (e.g., at an HMD processor communicably and/or electrically coupled to HMD sensors), but can be received at any suitable component. Sensor data is preferably received from the supplementary computing device (e.g., embedded in image data of received frame data), but can be received at the processor of the HMD from a sensor of the HMD, directly from a controller and/or supplementary sensing device, and/or received from any suitable component. Sensor data can be received continuously, periodically (e.g., at predetermined timer intervals such as every 5 milliseconds), and/or in response to satisfaction of an analysis event. Sensor data is preferably received after receiving the initial first eye frame data, but can additionally or alternatively be received prior to, after, and/or substantially concurrently with any suitable portion (e.g., S120) of the method 100. In a variation, receiving sensor data is based on a refresh rate (e.g., in Hz) of the HMD. For example, sensor data can be received at multiple predetermined times (e.g., at a time associated with receiving the initial first-eye frame data during the refresh cycle, at a time immediately prior to display of the initial first-eye frame during the refresh cycle, etc.) during a refresh cycle (e.g., in milliseconds). However, receiving sensor data can be performed in any manner.

S130 includes time-warping the initial first-eye and second-eye frame data. S130 functions to compensate for user head motion that occurs between the rendering of the initial first-eye and second eye-frames and the display of those frames to a user.

S130 preferably includes using received motion sensor data (e.g., in S125) to calculate the change in position and/or rotation between render time and display time. For example, time-warping can include determining a change in motion associated with a user from a first time to a second time, based on corresponding first and second motion datasets. S130 preferably includes identifying a particular sensor reading (or a particular value calculated from sensor readings) that corresponds to time, position, and/or motion when the frame is rendered. For example, the HMD may continuously transmit IMU data to an external computing device; when the external computing device renders a frame, it sends the frame along with the IMU sample identifier (e.g., sample #102304, sample taken at time 00231, etc.) corresponding to the motion sensor data used to render the frame (which is generally related to the pose of the frame).

Then, the change in position and/or rotation may be calculated from the motion sensor data. In the case of accelerometer data, this may include integrating all samples from the IMU sample used to render the frame until the current time to determine a change in position. If positional data is used (instead of acceleration data), the change in position may simply be the difference between the position/rotation of the IMU at render time and at display time.

Note that receiving an IMU sample identifier may have an additional benefit; if the HMD receives multiple frames having the same IMU sample identifier, this may be an indication of the transmitting device entering a failure state (e.g., repeating frames). In this case, the HMD may recognize that the frame is repeated and may discard it (instead of treating it as a new frame). However, using the motion sensor data to calculate change in position and/or rotation can be performed in any manner.

Time-warping can be varied (e.g., using different time-warping parameters, time-warping operations, etc.) based on different program content (e.g., objects, scenes, lighting, textures, geometry, etc.) and/or program logic associated with frame data, depth data, and/or any suitable criteria. Programs can include any one or more of: video games, simulations, rendering software, media, and/or any suitable software. Operations associated with accommodating for different program content (e.g., identifying a moving object image element) can be performed at the HMD, the supplementary computing system, and/or any suitable component.

In a variation, time-warping can include accommodating for one or more moving objects (e.g., a moving video game character) in the frame. During the time between rendering and display of an initial eye frame, a moving object can continue its motion path, which can be accommodated for by time-warping in order to reduce judder (e.g., an HMD screen artifact resulting in image blur). For example, the method can include identifying a moving object image element corresponding to a moving object represented by initial first-eye frame data; and determining an object motion parameter (e.g., describing translation and/or rotation of the object in the frame) associated with the moving object; time-warping the moving object image element based on the object motion parameter and the change in motion associated with the user. In this or another example, the method can include receiving a user input collected at a hand controller for a user to control the moving object, where determining the object motion parameter includes determining a controller-influenced object motion parameter based on the user input, and where time-warping the moving object image element is based on the controller-influenced object motion parameter.

In another variation, time-warping can include accommodating for one or more reflections (e.g., specular reflections, diffuse reflections, etc.), which can behave in a different manner than still objects in response to translation, rotation, and/or perspective change. In an example, the method can include identifying image elements corresponding to specular reflections (e.g., based on color histograms generated from image element data); determining supplementary depth data (e.g., additional to the depth data received in the initial frame data) for the identified image elements (e.g., such as based on a dense stereo algorithm); and time-warping the identified image elements based on the supplementary depth data and motion data associated with the user. However, varying time-warping can be performed in any manner.

Time-warping is preferably performed for each initial frame generated (e.g., initial first-eye frame and initial second-eye frame), but may additionally or alternatively be performed in response to an analysis event, including one or more of: motion data satisfying a motion threshold, complexity of a received frame, complexity of a frame to be rendered, frames per second threshold, time taken to render a frame, average time taken to render a set of frames, etc.), and/or at any suitable time. S130 can include concurrently, serially, and/or otherwise time-warping the initial first-eye frame, the initial second-eye frame, and/or any other suitable frames.

Alternatively, time-warping may never be performed for initial frame data. Since S130 only applies to initial frame data, it may not be critical to perform this step (as in many cases it will affect only a small subset of total frames displayed).

S130 preferably includes performing a full positional warp (accounting for both translation and rotation) on both of the initial images based on the change in position/rotation. For example, S130 can include determining a change in translation and rotation associated with the user from a first time (e.g., associated with generation of initial first-eye frame data such as at a supplementary computing system) to a second time (e.g. associated with receiving the initial first-eye frame data); and time-warping the initial first-eye frame data and the initial second-eye frame data based on depth data (e.g., associated with the initial first-eye frame data) and the change in translation and rotation. Additionally or alternatively, S130 may include performing any type of time-warping (e.g., performing warping solely to correct for orientation changes). However, full positional-warping can be performed in any manner.

In one implementation of a preferred embodiment, S130 includes performing predictive time-warping; that is, performing time-warping based on a predicted future position/rotation instead of a current one. This is preferably based on an estimation of how long it takes to perform time warping and display a frame; for example, if it takes approximately 10 ms to time-warp and display, accelerometer data may be extrapolated for an additional 10 ms (e.g., by extrapolating using a linear fit of the last ten samples) to estimate a predicted position/rotation. In another example, predictive time-warping can include extrapolating the motion dataset to a display time (e.g., during a refresh cycle) associated with displaying the time-warped first-eye frame and the time-warped initial second-eye frame; and time-warping based on the extrapolated motion dataset. In this or another example, the motion dataset can include first and second motion data corresponding to a first and a second time in the first refresh cycle; where extrapolating the motion data includes extrapolating based on a trend between the first and the second motion data. Additionally or alternatively, predictive time-warping can be based on program logic (e.g., for a video game executed by the HMD) and/or program content, which can indicate a situation correlated with a particular type of user motion (e.g., increased head rotation, decreased user translation, etc.). In an example, the method can include identifying a location of a virtual character controlled by the user; correlating the location with an increased probability of user motion based on the location's proximity in the program to a plurality of objects programmed to be interacted with by a user; and predictive time-warping based on the correlation (e.g., predicting a future position/rotation with an increased delta from the current position/rotation). In another example, motion data and/or other data associated with other users of a program can be used for predictive time-warping for a current user. However, predictive time-warping can be based on any suitable data, and can be performed in any manner.

S130 may additionally or alternatively include performing a radial warp to correct for spherical distortion caused by the optics in an HMD (or for any other 3D display characteristics). The radial warp is preferably performed after the time-warp, but may alternatively be performed at any time. In one embodiment, the radial warp is applied separately to each color channel (e.g., to account for chromatic aberration in HMD optics). Radial warping can be performed for any combination of pixels, superpixels, image segments, object vertexes, and/or other image elements of frame data. Radial warping may additionally or alternatively be performed in any step of the method 100 before display of the initial frames (or may not be performed at all, e.g., if the image is radially warped before being received, or if the 3D display does not introduce distortion). However, radial warping can be performed in any manner.

After Step S130, the method preferably includes displaying a first-eye frame and a second eye frame at a head-mounted display (HMD) worn by the user. The first and second eye frames are preferably determined based on the time-warped first-eye frame data and the time-warped second-eye frame data, respectively. The two initial frames may be displayed at any time. For example, the first-eye frame and second-eye frame may be displayed concurrently or at separate times. Likewise, S130 may be performed at separate times for separate frames (e.g., warp the first-eye frame, display the first eye-frame and simultaneously warp the second-eye frame, display the second eye frame). However, displaying the warped initial first-eye frame, the warped initial second-eye frame, and/or any suitable frame can be performed in any manner.

Figure 5:
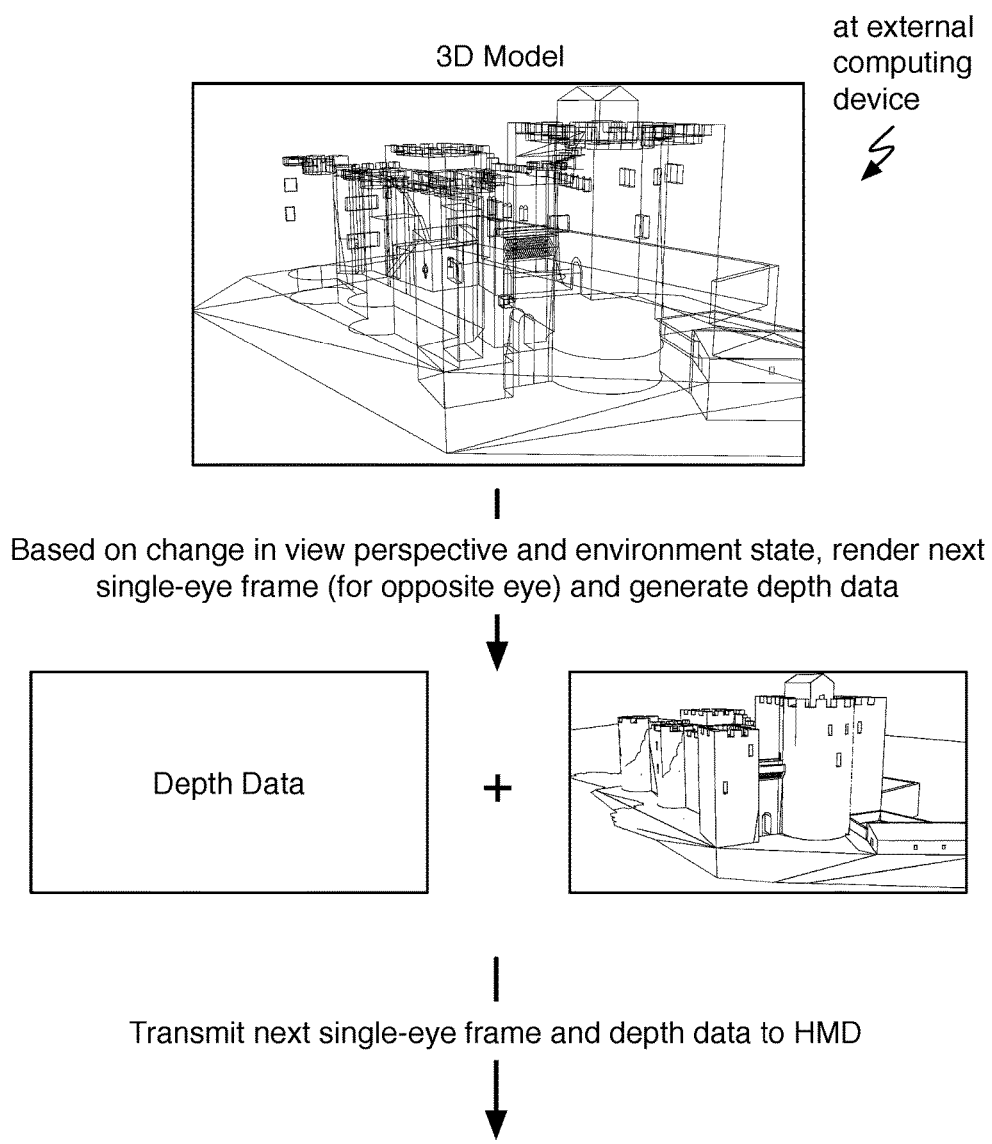
FIG. 5 is a chart representation of frame generation and transmission.

S140 includes receiving next second-eye frame data. The next second-eye frame data is preferably generated as shown in FIG. 5. S140 functions to receive frame data after initial frame (or an initial set of frames). S140 is preferably substantially similar to S110, except that the frame data received in S140 is for the eye opposite to the eye of S110 (e.g., if S110 includes receiving frame data for a user's right eye, S140 includes receiving frame data for a user's left eye). Additionally, the frame data received in S140 is rendered after the frame data received in S110, and so may include updates to the scene generated (e.g., updates due to user movement, updates due to animation in a virtual environment, etc.). The next second-eye frame data is preferably unwarped frame data (e.g., a frame that has no had warping performed on it), but can alternatively be a warped, reprojected, and/or other type of frame data. It is significant that the frame data received in S140 is opposite to the previously received frame data (or to one of a set of previously received frames); this allows the most recent previous image used in S170 to be a full image (rather than an image containing holes; e.g., an image generated via reprojection). Alternatively, the received frame data can be for the same eye (e.g., next first-eye frame data) corresponding to the previously received frame data. This is explained in more detail in the section covering S170.

S140 preferably occurs after S130, but may additionally or alternatively occur any time after S110. For example, the next frame data may be received before the initial frame data is time-warped and displayed. However, receiving next second-eye frame data and/or any suitable frame data can be performed in any manner.

S150 includes perspective warping the initial first-eye frame data. S150 functions to warp the initial first-eye frame data based on the change in perspective occurring between rendering of the initial first-eye frame data and rendering of the next first-eye frame data. The resultant frame data represents (at the time of the next frame render) outdated information, but may be useful for performing infilling on the next first-eye frame data (because the next first-eye frame data is a reprojection of the next second eye frame data, as described in S160).

S150 preferably includes performing a perspective warp on the initial first-eye frame data prior to radial warping (but after time-warping in S130), but may additionally or alternatively include performing a perspective warp on any version of the initial first-eye frame data (e.g., before or after time-warp, before or after radial warp, etc.). The initial first-eye frame data (pre-radial-warp, post-time-warp) is preferably stored in a buffer or other temporary storage to allow it to be used in S150.

S150 may be performed at any time, but is preferably performed after receiving information about the next second-eye frame data (which may include actually receiving the next second-eye frame data, as in S140, or may simply include receiving some information about the next second-eye frame data, such as pose or position data) but can by performed in relation to any analysis event (e.g., receiving a new motion dataset, reprojecting the next second-eye frame data to the next first-eye frame data, etc.), and/or at any suitable time. Perspective-warping is preferably performed during a time period (e.g., a second refresh cycle) in which the next second-eye frame data is received. Alternatively, perspective-warping can be partially and/or fully performed during a time period (e.g., a first refresh cycle) in which the initial first-eye frame data is received, and/or at any suitable time.

As previously stated, S150 preferably includes performing perspective warping based on a difference in perspective between rendering of the initial first-eye frame data and rendering of the next second-eye frame data. For example, S150 can include determining a change in frame perspective from initial first-eye frame data to next second-eye frame data; and perspective warping the initial first-eye frame data to generate perspective-warped initial first-eye frame data based on the change in frame perspective. The difference in perspective is preferably calculated by taking a difference of perspective data provided with the two frames, but may additionally or alternatively be calculated from other data; for example, image analysis of the difference between an initial frame (either the original or reprojected frame) and a next frame may be used to determine a change in perspective.

The difference in perspective may need to be adjusted by performing perspective warping (alternatively, the perspective data itself may be adjusted before calculating the difference). For example, the perspective data provided with each frame (received in S110, S140) may be a six coordinate pose for the center of a user's head; this pose may need to be adjusted to a pose for a user's left or right eye.

Perspective-warping can be varied (e.g., different perspective-warping parameters, perspective-warping operations, etc.) and/or the difference in perspective can be partially or fully calculated based on: motion data (e.g., received in S125; associated with a time during a first refresh cycle in which the initial first-eye frame data was received; associated with a time during a second refresh cycle in which the next second-eye frame data was received; motion data received after receiving the next second-eye frame; extrapolated motion data, etc.), controller data (e.g., user inputs at the controller, controller sensor data), program content, program logic, and/or any other suitable criteria. For example, the method can include determining a change in translation and rotation associated with the user based on first motion data and second motion data sampled at the HMD during a first and second time period, respectively, and perspective-warping based on the change. However, it is worth noting that the change in perspective may not solely be due to movement of a user (head or otherwise). For example, a user may use a joystick to move forward in a virtual world; in this example, the user's perspective changes over time independent of user head motion. In another example, the method can include receiving controller data including user inputs during a time period at a controller associated with the HMD; and where perspective warping is based on the controller data. In another example, program logic can describe that a new virtual character is about to appear in the user perspective, and perspective-warping can include depicting the new virtual character in the perspective-warped frame data. However, varying perspective-warping can be performed in any manner.

Any number of perspective warps can be performed on any suitable frames using any suitable perspective warp parameters and/or criteria. In a variation, S150 can include performing a set of perspective-warps (e.g., according to different sets of perspective-warping parameters) on the initial first-eye frame data and/or any other suitable data, in order to generate a set of perspective-warped images (e.g., to be used for infilling in S170). In an example, the set of perspective-warps can be determined based on motion data (e.g., user position/rotation) at a time associated with the received next second-eye frame data. In a specific example, the method can include receiving motion data indicating user's head is rotated 90 degrees counter-clockwise (e.g., a user has turned their head leftwards) along a y-axis (e.g., yaw) longitudinally extending through the user's body; determining a set of perspective-warp parameters for generating perspective-warped frame data including a larger proportion of frames with variances in rotation along the x-axis (e.g., pitch) and the z-axis (e.g., roll), and a smaller proportion of images with variances in further counter-clockwise rotation along the y-axis.

S150 can include storing (e.g., caching) perspective-warped frame data to enable, for example, efficient retrieval for infilling operations (e.g., in S170). For example, the method can include storing perspective-warped frame data generated over multiple time periods (e.g., multiple refresh cycles). Additionally or alternatively, any suitable frame data can be stored in any manner.

S150 preferably includes performing a full positional warp (accounting for both translation and rotation) on the initial first-eye frame data based on the change in view position/orientation (note: not just change in user position/orientation, unless this is the only change affecting view position/orientation) between the first frame (either as rendered or as displayed) and second frame (as rendered). Additionally or alternatively, S150 may include performing any type of perspective warping (e.g., performing warping solely to correct for view orientation changes).

S150 may include performing a radial warp on the initial first-eye frame data (before or after the perspective warp) as described in S130, depending on whether the frame data was previously radially warped (and whether radial warping is desired, in general).

However, perspective warping the initial first-eye frame data and/or any suitable frame data can be performed in any manner.

Figure 6:
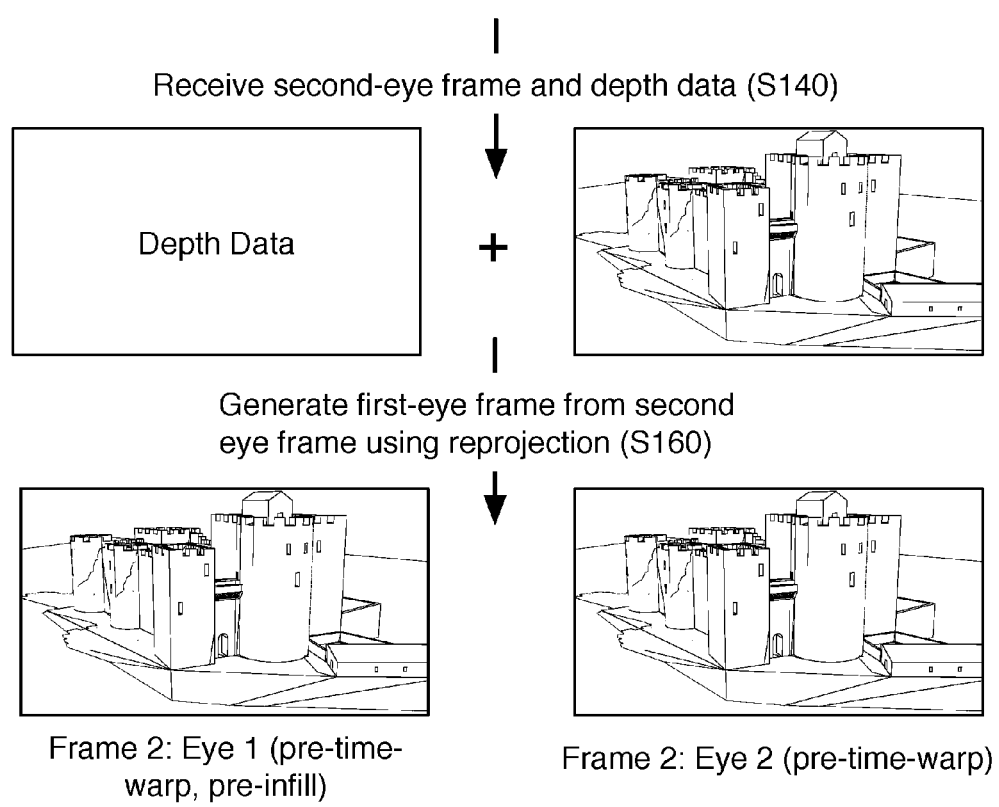
FIG. 6 is a chart representation of frame reception and reprojection of a method of a preferred embodiment.

As shown in FIG. 6, S160 includes reprojecting the next second-eye frame to the first eye. S160 is preferably substantially similar to S120, except that reprojection is performed on the opposite frame as in the previous frame (described in more detail in S140). S160 is preferably performed on an unwarped, non-reprojected frame data, but can additionally or alternatively be performed on warped next second-eye frame data (e.g., generated after receiving a next second-eye frame; and positional-warping the next second-eye frame; etc.) and/or next second-eye frame data resulting from reprojection. However, reprojecting the next second-eye frame data can be performed in any manner.

Figure 7:
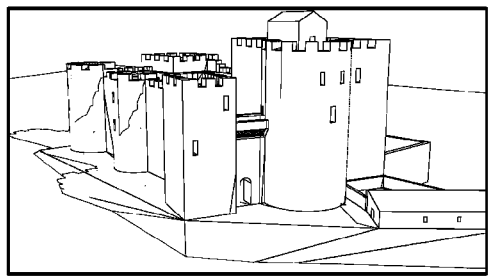
FIG. 7 is a chart representation of perspective warping and infilling of a method of a preferred embodiment.
Figure 7:
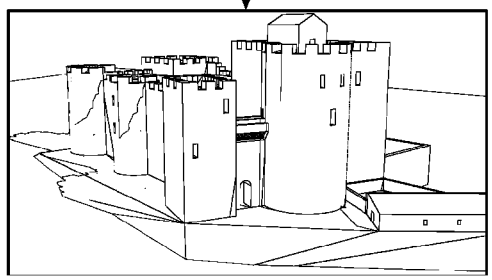
Figure 7:
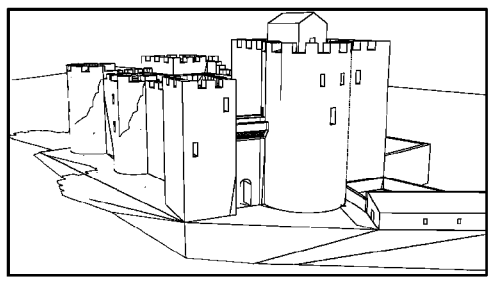

S170 includes performing infilling on the next first-eye frame data with the perspective warped initial first-eye frame data, as shown in FIG. 7. S170 functions to fill holes (e.g., occlusions) and/or otherwise correct artifacts present in the next first-eye frame data resulting from reprojection in S160. Infilling is preferably performed on the next first-eye frame data to generate filled next first-eye frame data, but infilling can be for any suitable number and/or type of frames. Each of the holes (e.g., occlusions) of a frame are preferably filled by S170, but a subset of holes can alternatively be filled.

S170 preferably includes performing infilling by using image data from the perspective-warped initial first-eye frame data to fill areas where image data is missing in the next first-eye frame data as a consequence of reprojection, warping, and/or other operations. Additionally or alternatively, S170 may generate infill data from image data of the perspective-warped initial first-eye frame data (as opposed to simply using the image data of the perspective-warped initial first-eye frame directly). For example, S170 may include using an algorithm that samples areas around the holes of the next first-eye frame data and uses both this sampled data and data from the perspective-warped initial first-eye frame data to generate infill data (i.e., the data used to fill the holes in the next first-eye frame data). In another example, S170 can include: identifying an image element location of an image element occlusion in the next first-eye frame data; mapping the image element location to a corresponding image element location in the perspective-warped initial first-eye frame data; and filling the image element occlusion with image element data at the corresponding image element location. As another example, S170 may process the image data of the perspective-warped initial first-eye frame (e.g., blurring the image data) before performing infilling with it. S170 may include processing and/or combining image data of the perspective-warped initial first-eye frame in any manner to generate infill data. Infilling can be performed by using a warped initial first-eye frame (e.g., image data from a perspective-warped frame generated S150), but can additionally or alternatively be performed by using one or more: unwarped frame data (e.g., the unwarped initial first-eye frame), frame data resulting from reprojection (e.g., infilled frame data generated from reprojection and infilling prior to the initial first eye-frame), historic frame data (e.g., historic first-eye frames generated prior to the initial first-eye frame, historic second-eye frames, etc.), composite frames (e.g., generated from a set of first-eye frames), reference frames (e.g., generated by a program developer; a reference frame rendered for a device distinct from the HMD; etc.), and/or any suitable frames. However, infilling can be performed on a frame without using another frame. For example, S170 can include identifying an occluded image element of the next first-eye frame; identifying the nearest image element to the occluded image element (e.g., based on image element x-y coordinates and/or depth data); and infilling the occlude image element based on image data (e.g., RGB values) of the nearest image element (e.g., using the same RGB values to infill; interpolating image data from a set of nearest image elements; etc.).

Note that the algorithm used to generate infill data in S170 may be variable depending on a number of factors; including the size and/or number of holes present in the next first-eye image, motion in between frames, framerate, image content, image purpose (e.g., movie, video game, etc.), and/or any other data. For example, S170 can include infilling a first image element (e.g., an image element surrounded in the x-y coordinate plane by non-occluded image elements) with a first infilling algorithm (e.g., RGB value interpolation based on the surrounding image element RGB values), and infilling a second image element (e.g., an image element surrounded by occluded image element) with a second infilling algorithm (e.g., using non-occluded image elements from perspective-warped initial first-eye frame data).

Performing infilling is preferably in response to perspective-warping the initial first-eye frame data, but can additionally or alternatively be performed in relation to a different analysis event (e.g., reprojecting the next second-eye frame data to the next first-eye frame data, etc.), at a specific time during a time period (e.g., immediately prior to display of the next first-eye and next second-eye frames at the HMD during a refresh cycle), and/or at any time.

In a variation, infilling can be based on frame data (e.g., a composite frame) associated with a plurality of frames. For example, the method can include caching a set of perspective-warped frame data collected generated over multiple time periods (e.g., performing S160 for multiple refresh cycles); combining (e.g., averaging pixel values, image stitching, etc.) the set of perspective-warped frame data to generate composite frame-data; and infilling occluded frame data based on the composite frame data. In another example, the method can include identifying a position of an occluded image element based on positions of the nearest non-occluded image elements; identifying reference image elements in the set of frames representing the same object as the nearest non-occluded image elements (e.g., based on matching image element data such as RGB values); for each frame of the set of frames, analyzing image elements of the frame to identify a target image element that maps to the occluded image element (e.g., sharing the same image element position relative the non-occluded image elements), based on the reference image elements; and filling the occluded image element with the image element data of the target image element.

In another variation, infilling can be based on multiple variants of a frame, generated such as by performing multiple perspective-warps on the frame and/or frame data using different perspective-warping parameters (e.g., in S150).

In another variation, infilling can be based on non-cropped frames. For example, the method can include displaying a cropped frame (e.g., a cropped initial first-eye frame) rather than the full frame generated (e.g., a full initial first-eye frame); perspective-warping the full frame; and using the full frame for infilling an occluded cropped frame (e.g., a cropped next first-eye frame generated from reprojection in S160).

However, performing infilling on the next first-eye frame data and/or any suitable frame data can be performed in any manner.

Figure 8:
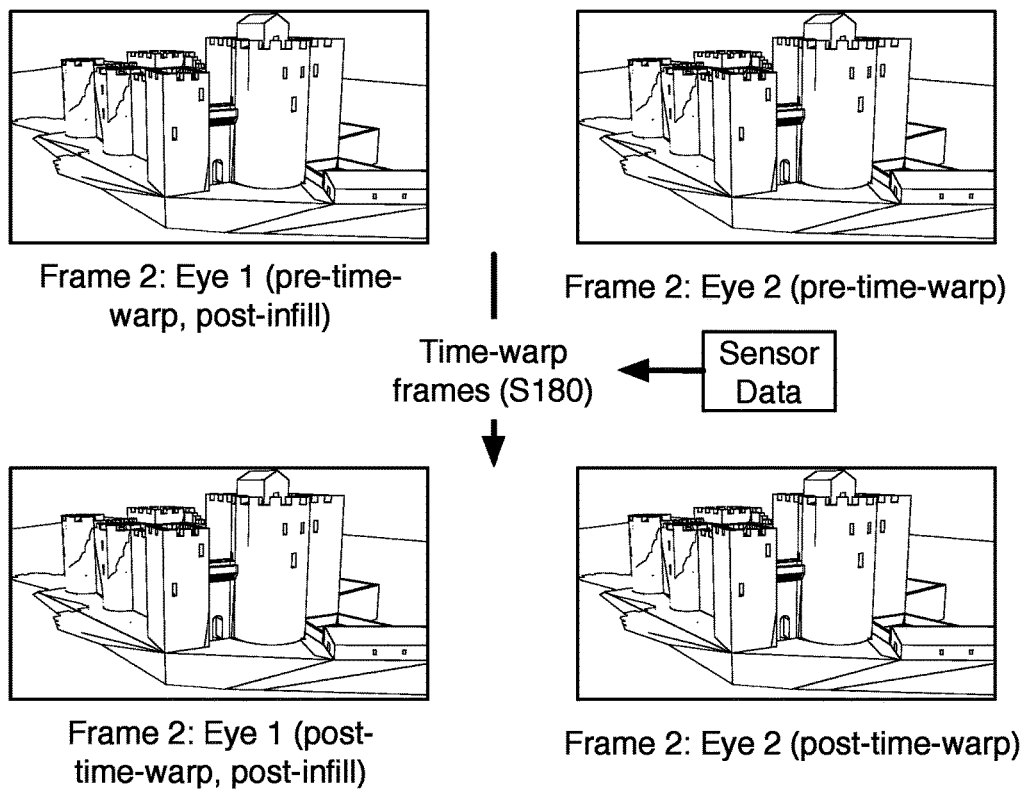
FIG. 8 is a chart representation of time-warping of a method of a preferred embodiment.

S180 includes time-warping the next first-eye and second-eye frame data, as shown in FIG. 8. S180 can use any combination of the approaches described in S130 and/or other suitable portions of the method 100. S180 is preferably substantially similar to S130, except that it is performed on the next first-eye (e.g., filled next first-eye frame data) and next second-eye frame data (as opposed to the initial ones). Alternatively, S180 can be substantially different from S130. For example, time-warping the initial first-eye and initial second-eye frame data can include radial warping of the respective frames, while time-warping the next first-eye and next second-eye frame data can exclude a radial warping operation. However, time-warping the next first-eye frame, the next second-eye frame, and/or any suitable frame data can be performed in any manner.

After Step S180, the HMD preferably displays the two time-warped next frames. Additionally or alternatively, the two next frames may be displayed at any time. For example, the first-eye frame and second-eye frame may be displayed at separate times. Likewise, S180 may be performed at separate times for separate frames (e.g., warp the second-eye frame, display the second-eye frame and simultaneously warp the first-eye frame, display the first eye frame). However, displaying the time-warped next frame can be performed in any manner.

The method 100 can additionally or alternatively include encoding transmitted frame data with sensor data (e.g., motion sensor data) S190. Encoding transmitted frame data functions to facilitate receipt of sensor data (e.g., at an HMD) at a time allowing for operations (e.g., warping, reprojection) to be performed on the frame prior to the scheduled time (e.g., based on HMD screen refresh rate) for display of the frame. Any amount and/or type of sensor data can be included with transmitted frames. As mentioned previously, to provide effective time-warping, it is important for the time-warping system to know the motion and/or difference in position between frame rendering and frame display. If this information is transmitted independently of video frames, it may not be received at the same time, increasing difficulty in performing time-warping. Further, the information increases the size of the transmitted dataset.

Rendered frames are preferably tagged with sensor data (e.g., corresponding to the time associated with the rendered frame) at the supplementary computing system (e.g., in response to rendering a frame), but can be tagged at any suitable component. For example, the method can include collecting sensor data at one or more sensors (e.g., HMD sensors, controller sensors, camera subsystems positioned proximal the remote computing device, etc.); transmitting the sensor data to the supplementary computing system (e.g., from the HMD); generating first-eye frame data at the supplementary computing system; modifying the first-eye frame data with the sensor data at the supplementary computing device; and receiving the modified first-eye frame system at the HMD from the supplementary computing system.

Figure 11:
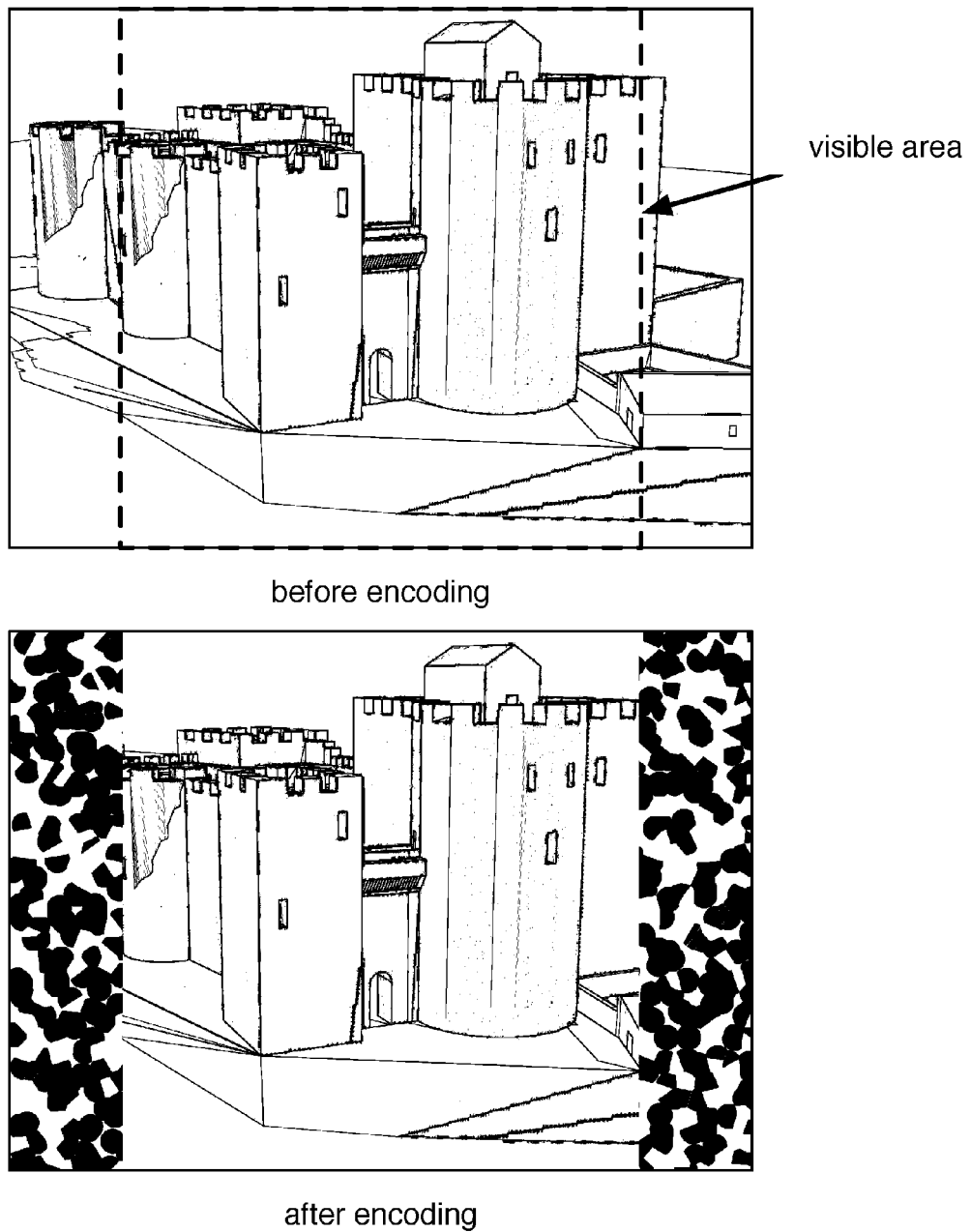
FIG. 11 is a chart representation of spatiochromatic motion data encoding of a method of a preferred embodiment.

In a variation, S190 can include encoding sensor data (e.g., an IMU sample number) into each transmitted frame using a spatiochromatic code. The method 100 may embed this information into any area of an image (e.g., dark areas), but the method 100 preferably includes embedding this information into an un-displayed section of a frame, as shown in FIG. 11. These undisplayed sections result as a function of the optics in the HMD—often, the entire display is not visible to the user due to distortion or aspect ratio differences (e.g., an HMD using a circular lens on a rectangular display). A spatiochromatic code providing sensor data can be inserted into this area without affecting the user experience, thus enabling the transmission of sensor data without using additional data or a separate communication channel. In another variation, S190 can include encoding sensor data in metadata associated with one or more images of transmitted frame data. In another variation, S190 can include modifying one or more bits of image elements in frame data. For example, S190 can include modifying the last bit of each byte of image elements to reduce the color change to the image elements. In another example, S190 can include modifying bits of bytes corresponding to image elements at edges, dark spaces, and/or other regions of an image. However, encoding transmitted frame data with sensor data and/or other suitable data can be performed in any manner.

Note that while the method 100 is described above as a process operating on an initial frameset and then a next frameset, the method 100 preferably operates in a looping fashion; for example, after S180, the HMD preferably receives another frame (opposite to the one received in S140) and depth data, and S140, S150, S160, S170, and S180 are performed, with the 'other frame' taking the role of the next frame in these steps, and the 'next frames' taking the role of the 'initial frames' in these steps. For example, the method can include, receiving subsequent first-eye frame data (e.g., subsequent to the initial and next first-eye frame data) including depth data; generating subsequent second-eye frame data stereoscopically complementing the subsequent first-eye frame data (e.g., based on the depth data, user eye distance); filling a subsequent image element occlusion of the subsequent second-eye frame data to based on the next second-eye frame; time-warping the filled subsequent second-eye frame data and the subsequent first-eye frame data based on a change in motion of the user during a third time period (e.g., a third refresh cycle); and displaying subsequent eye frames based on the subsequent eye frame data. In this example, filling the subsequent image element occlusion is based on the next second-eye frame data and the initial first-eye frame data. The primary difference between the first set of steps (i.e., S110-S130) and the second set of steps (i.e., S140-S180) is that in the second set of steps, past frame data is available and suitable for using to generate infill data. Accordingly, the loop may reset (that is, reinitialize with S110-S130) at any point. For example, the method 100 may include restarting at S110 (instead of continuously looping S140-S180) whenever an exceptionally large change in a scene occurs (e.g., due to change in user position or simply due to change in the virtual environment rendered). As another example, the loop may reinitialize every 1000 frames. The parameters of how the steps are looped (and how data is sampled for infilling, etc.) may be changed based on any parameters.

Further note that time-warping, as described in S130 and S180, may be performed multiple times (approaching continuously) for a given frame. In the limiting case, time-warping may be performed each time a motion sensor sample is taken (which may happen many times per frame). This ability to perform time warping independent of the framerate allows the display framerate of the HMD to be decoupled from the rendered framerate. In other words, the display framerate of the HMD is not necessarily dependent on the framerate of rendered frames.

Additionally or alternatively, any portions of the method 100 can be performed in serial (e.g., on a single thread), in parallel (e.g., asynchronously on different threads in parallel processing), and/or in any suitable temporal relationship with other portions of the method 100. For example, reprojecting first-eye frame data to second-eye frame data (e.g., in S120) can be performed substantially concurrently with determining a change in motion during a time period, where the change in motion can be used in time-warping the first-eye and second-eye frame data. In another example, perspective-warping the initial first-eye frame data (e.g., in S150) can be performed substantially concurrently with time-warping the initial first-eye frame data (e.g., in S130), reprojecting the next second-eye frame data (e.g., in S160) and/or any other portion of the method 100.

Further, any portions of the method 100 can be performed based on a refresh rate of the HMD, which dictates the duration of a given refresh cycle. For example, S110, S120, S125, S130, and/or displaying the initial frames can be performed during a first refresh cycle, and S140, S150, S160, S170, S180, and displaying the next frames can be performed during a second refresh cycle.

The method 100 has been primarily described from the perspective of the HMD correcting for latency induced by wireless transmission of video from a rendering source, but as mentioned previously, the method 100 may be operable in a system including both a local wireless video transmitter (and potentially an attached local external computing device) and a remote external computing device.

In such a scenario, it may be advantageous to perform certain steps of the method 100 multiple times to correct for latencies induced by different connections; in particular, time-warping may be performed multiple times at different locations.

Figure 9:
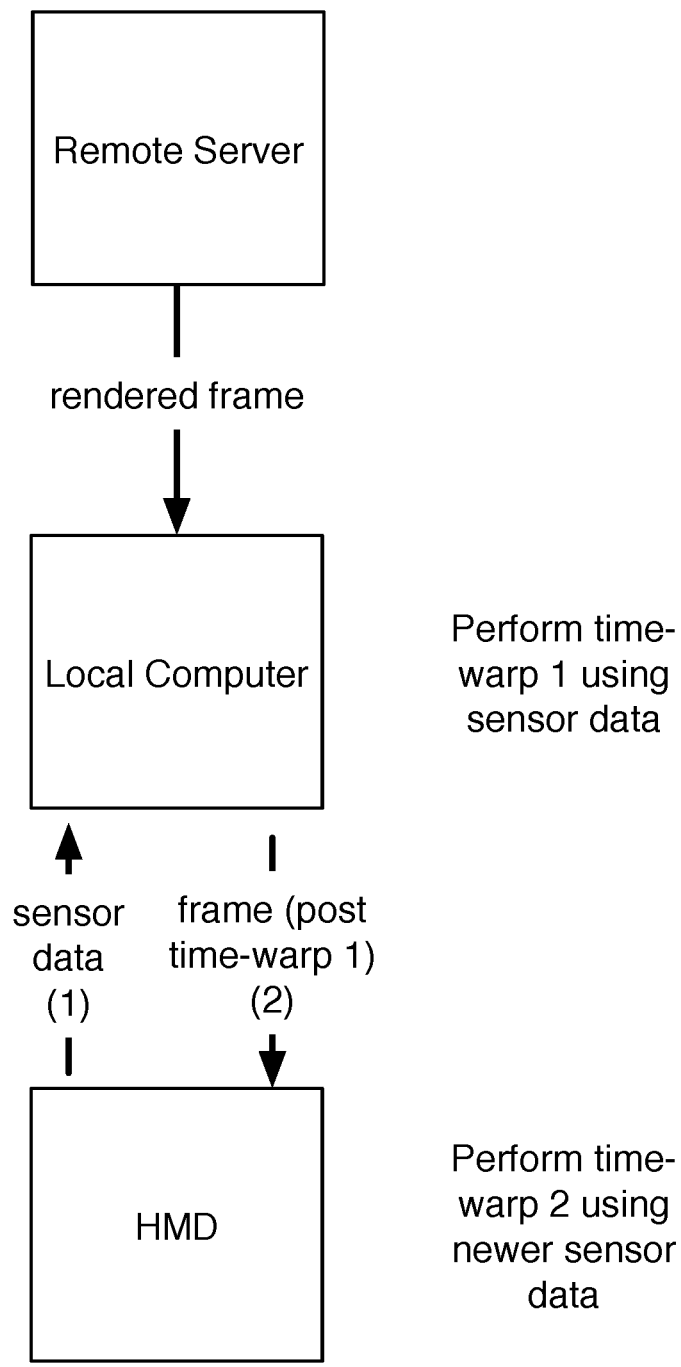
FIG. 9 is a diagram representation of multi-system performance of steps of a method of a preferred embodiment.

For example, as shown in FIG. 9, a first time-warp may be performed at a local computer, while a second time-warp may be performed at the HMD. This may be advantageous in situations where the latency between the remote sever and local computer is much higher than between the local computer and HMD and/or the increased computational power of the local computer allows it to provide a higher performance time-warp operation.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for 3D video display. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for reduced-bandwidth wireless video transmission, the method comprising:
    at a head-mounted display (HMD) worn by a user:
        receiving initial first-eye frame data comprising first depth data, the initial first-eye frame data generated at a first time;
        generating initial second-eye frame data stereoscopically complementing the initial first-eye frame data, based on the first depth data and a distance between a first and a second eye of the user;
        time-warping the initial first-eye frame data and the initial second-eye frame data based on a change in motion of the user during a first time period comprising the first time and a second time associated with receiving the initial first-eye frame data;
        displaying an initial first-eye frame and an initial second-eye frame based on the time-warped initial first-eye frame data and the time-warped initial second-eye frame data, respectively;
        receiving next second-eye frame data comprising second depth data, the next second-eye frame data generated at a third time;
        generating next first-eye frame data stereoscopically complementing the next second-eye frame data, based on the second depth data and the distance between the first and second eyes;
        filling an image element occlusion of the next first-eye frame data to generate filled next first-eye frame data based on the initial first-eye frame data;
        time-warping the filled next first-eye frame data and the next second-eye frame data based on a change in motion of the user during a second time period comprising the third time and a fourth time associated with receiving the next second-eye frame data; and
        displaying a next first-eye frame and a next second-eye frame based on the time-warped filled next first-eye frame data and the time-warped next second-eye frame data.

2. The method of claim 1, further comprising, at the HMD:
    determining a change in frame perspective from the initial first-eye frame data to the next second-eye frame data; and
    perspective warping the initial first-eye frame data to generate perspective-warped initial first-eye frame data based on the change in frame perspective, wherein filling the image element occlusion is based on the perspective-warped initial first-eye frame data.

3. The method of claim 2, where determining the change in frame perspective comprises determining a change in translation and rotation associated with the user based on first motion data and second motion data sampled at the HMD during the first time period and second time period, respectively, and wherein perspective warping the initial first-eye frame data is based on the change in translation and rotation.

4. The method of claim 2, further comprising, at the HMD: receiving controller data comprising user inputs during the first time period at a controller associated with the HMD; and wherein perspective warping the initial first-eye frame data is based on the controller data.

5. The method of claim 2, wherein filling the image element occlusion comprises:
    identifying an image element location of the image element occlusion in the next first-eye frame data;
    mapping the image element location to a corresponding image element location in the perspective-warped initial first-eye frame data; and
    filling the image element occlusion with image element data at the corresponding image element location.

6. The method of claim 1,
    wherein the first and the second time period are respectively a first and a second refresh cycle comprising a duration based on a refresh rate of the HMD;
    wherein receiving the initial first-eye frame data, generating the initial second-eye frame data, and displaying the initial first-eye frame and the initial second-eye frame are during the first refresh cycle; and
    wherein receiving the next second-eye frame, generating the next first-eye frame data, and displaying the next first-eye frame and the next second-eye frame are during the second refresh cycle.

7. The method of claim 6, further comprising, at the HMD:
    receiving a motion dataset sampled at the HMD during the first refresh cycle;

extrapolating the motion dataset to a display time associated with displaying the initial first-eye frame and the initial second-eye frame;
wherein time-warping the initial first-eye frame data comprises predictive time-warping the initial first-eye frame data based on the extrapolated motion dataset.

8. The method of claim 7:
wherein receiving the motion dataset comprises receiving first and second motion data corresponding to the first and the second time in the first refresh cycle; and
wherein extrapolating the motion dataset comprises extrapolating based on a trend between the first and the second motion data.

9. The method of claim 1, further comprising, at the HMD:
receiving subsequent first-eye frame data comprising third depth data, the subsequent first-eye frame data generated at a fifth time;
generating subsequent second-eye frame data stereoscopically complementing the subsequent first-eye frame data, based on the third depth data and the distance between the first and second eyes;
filling a subsequent image element occlusion of the subsequent second-eye frame data to generate filled subsequent second-eye frame data based on the next second-eye frame data;
time-warping the filled subsequent second-eye frame data and the subsequent first-eye frame data based on a change in motion of the user during a third time period comprising the fifth time and a sixth time associated with receiving the subsequent first-eye frame data; and
displaying a subsequent first-eye frame and a subsequent second eye frame based on the time-warped subsequent first-eye frame data and the time-warped filled subsequent second-eye frame data, respectively.

10. The method of claim 9, wherein filling the subsequent image element occlusion is based on the next second-eye frame data and the initial first-eye frame data.

11. The method of claim 1, further comprising, at the HMD:
sampling a motion dataset during the first time period; and
transmitting the motion dataset to a supplementary computing system;
wherein the initial first-eye frame data is modified initial first-eye frame data comprising data from the motion dataset;
wherein receiving the initial first-eye frame comprises receiving the modified initial first-eye frame data from the supplementary computing system.

12. A method for reduced-bandwidth wireless video transmission, the method comprising:
receiving first-eye frame data comprising first depth data;
receiving a first motion dataset corresponding to a first time associated with generation of the first-eye frame data;
receiving a second motion dataset corresponding to a second time associated with receiving the first-eye frame data;
determining a change in motion associated with a user from the first time to the second time, based on the first and the second motion dataset;
generating second-eye frame data stereoscopically complementing the first-eye frame data, based on the first depth data and a distance between a first and a second eye of the user;
time-warping the first-eye frame data and the second-eye frame data based on the change in motion;
displaying a first-eye frame and a second eye frame at a head-mounted display (HMD) worn by the user, based on the time-warped first-eye frame data and the time-warped second-eye frame data, respectively;
receiving next second-eye frame data comprising second depth data;
generating next first-eye frame data stereoscopically complementing next second-eye frame data, based on the second depth data and the distance between the first and second eyes;
filling an image element occlusion of the next first-eye frame data to generate filled next first-eye frame data;
time-warping the filled next first-eye frame data and the next second-eye frame data; and
displaying a next first-eye frame and a next second-eye frame based on the time-warped next first-eye frame data and the next second-eye frame data, respectively.

13. The method of claim 12, further comprising:
identifying an image element corresponding to a reflection represented by the first-eye frame data;
determining supplementary depth data for the image element; and
perspective-warping the first-eye frame data based on the supplementary depth data;
wherein filling the image element occlusion is based on the perspective-warped first-eye frame data.

14. The method of claim 12, wherein the first depth data comprises a disparity map indicating disparity between image element location of the first-eye frame data and image element location of the second-eye frame data, and wherein generating the second-eye frame data is based on the disparity map.

15. The method of claim 14, further comprising:
identifying an object type of an object represented by the first-eye frame data;
determining a pixel shift value for an image element corresponding to the object based on the object type;
wherein the disparity map comprises the pixel shift value;
wherein generating the second-eye frame data comprises shifting image element location of the image element based on the pixel shift value.

16. The method of claim 12, further comprising:
identifying a moving object image element corresponding to a moving object represented by the first-eye frame data; and
determining an object motion parameter associated with the moving object;
wherein time-warping the first-eye frame data comprises time-warping the moving object image element based on the object motion parameter and the change in motion associated with the user.

17. The method of claim 16, further comprising:
receiving a user input collected at a controller for the user to control the moving object;
wherein determining the object motion parameter comprises determining a controller-influenced object motion parameter based on the user input;
wherein time-warping the moving object image element is based on the controller-influenced object motion parameter.

18. The method of claim 12, wherein determining the change in motion comprises determining a change in translation and rotation associated with the user from the first time to the second time; and wherein time-warping the first-eye frame data and the second-eye frame data is based on the first depth data and the change in translation and rotation.

19. The method of claim 12, wherein generating the second-eye frame data is performed substantially concurrently with determining the change in motion.

20. A method for reduced-bandwidth wireless video transmission, the method comprising:
receiving first-eye frame data comprising first depth data;
receiving a first motion dataset corresponding to a first time associated with generation of the first-eye frame data;
receiving a second motion dataset corresponding to a second time associated with receiving the first-eye frame data;
determining a change in motion associated with a user from the first time to the second time, based on the first and the second motion dataset;
generating second-eye frame data stereoscopically complementing the first-eye frame data, based on the first depth data and a distance between a first and a second eye of the user;
time-warping the first-eye frame data and the second-eye frame data based on the change in motion;
displaying a first-eye frame and a second eye frame at a head-mounted display (HMD) worn by the user, based on the time-warped first-eye frame data and the time-warped second-eye frame data, respectively;
identifying a moving object image element corresponding to a moving object represented by the first-eye frame data; and
determining an object motion parameter associated with the moving object;
wherein time-warping the first-eye frame data comprises time-warping the moving object image element based on the object motion parameter and the change in motion associated with the user.

21. The method of claim 20, further comprising:
receiving a user input collected at a controller for the user to control the moving object;
wherein determining the object motion parameter comprises determining a controller-influenced object motion parameter based on the user input;
wherein time-warping the moving object image element is based on the controller-influenced object motion parameter.

* * * * *